(12) United States Patent
Patwardhan et al.

(10) Patent No.: US 10,324,804 B1
(45) Date of Patent: Jun. 18, 2019

(54) INCREMENTAL BACKUP WITH EVENTUAL NAME SPACE CONSISTENCY

(71) Applicant: EMC Corporation, Hopkinton, MA (US)

(72) Inventors: Kedar Patwardhan, Irvine, CA (US); Thomas Papadakis, Burlington (CA); Ernest Daza, Rancho Santa Margarita, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 575 days.

(21) Appl. No.: 14/871,840

(22) Filed: Sep. 30, 2015

(51) Int. Cl.
| | | |
|---|---|---|
| *G06F 7/00* | (2006.01) | |
| *G06F 17/00* | (2019.01) | |
| *G06F 11/14* | (2006.01) | |
| *G06F 16/10* | (2019.01) | |
| *G06F 16/23* | (2019.01) | |

(52) U.S. Cl.
CPC ...... *G06F 11/1451* (2013.01); *G06F 11/1448* (2013.01); *G06F 16/10* (2019.01); *G06F 16/2358* (2019.01)

(58) Field of Classification Search
CPC .......... G06F 11/1469; G06F 17/30091; G06F 17/30088; G06F 17/30174; G06F 17/30233; G06F 17/30575
See application file for complete search history.

(56) References Cited

U.S. PATENT DOCUMENTS

| | | | | |
|---|---|---|---|---|
| 7,890,469 B1* | 2/2011 | Maionchi | ................ | G06F 16/10 |
| | | | | 707/654 |
| 8,375,181 B1* | 2/2013 | Kekre | ..................... | G06F 3/061 |
| | | | | 711/162 |
| 9,329,859 B1* | 5/2016 | Azrieli | ................ | G06F 16/2358 |
| 2002/0023198 A1* | 2/2002 | Kokubun | .............. | G06F 3/0617 |
| | | | | 711/162 |
| 2003/0144990 A1* | 7/2003 | Benelisha | ............. | G06F 16/148 |
| 2004/0060053 A1* | 3/2004 | Veselov | ................... | G06F 21/52 |
| | | | | 719/310 |
| 2004/0064434 A1* | 4/2004 | Sampson | ................ | G06Q 20/04 |
| 2005/0149577 A1* | 7/2005 | Okada | .................. | G06F 11/1458 |
| 2007/0185934 A1* | 8/2007 | Cannon | ............... | G06F 11/1469 |
| 2009/0172478 A1* | 7/2009 | Watanabe | ........... | G06F 11/1451 |
| | | | | 714/54 |
| 2010/0223274 A1* | 9/2010 | DeHaan | .............. | G06F 16/1734 |
| | | | | 707/758 |
| 2013/0212067 A1* | 8/2013 | Piasecki | .............. | G06F 16/1787 |
| | | | | 707/620 |
| 2015/0269213 A1* | 9/2015 | Avati | ................ | G06F 17/30368 |
| | | | | 707/693 |

* cited by examiner

*Primary Examiner* — Hasanul Mobin
(74) *Attorney, Agent, or Firm* — Workman Nydegger

(57) ABSTRACT

Systems and methods for backing up data are disclosed. Changes made to a file system are tracked in a change log. When a backup operation is initiated, the changes identified in the change log are applied to the backup save sets. When a file associated with an event in the change log cannot be identified, the file is identified using the inode or other identifier. The event in the change log is then applied once the file is identified. The backup so achieved has eventual name space consistency and can be achieved without taking a snapshot of the file system.

18 Claims, 2 Drawing Sheets

INCREMENTAL BACKUP WITH EVENTUAL NAME SPACE CONSISTENCY

FIELD OF THE INVENTION

Embodiments of the present invention relate to systems and methods for protecting data. Embodiments of the invention further relate to systems and methods for performing backup operations without using a snapshot. Embodiments of the invention further relate to eventually name space consistent backups such as incremental backups that are generated without using a snapshot.

BACKGROUND

Computing systems have become ubiquitous. Businesses and individuals use computer systems and devices on a regular basis, and these computing systems and devices connect with each other over various networks. The data stored or used by these computing systems is usually very important to the owner of the data. An entity may be able to survive the loss of hardware, but that same entity may not be able to survive a loss of data for any extended period of time.

To protect against data loss, data may be backed up. By backing up data, the data can be recovered in the event of data loss or for other reasons. However, the amount of data used or maintained by an entity or even an individual increases over time and conventional backup operations are becoming increasing complex and require significant storage space.

One of the problems associated with backup operations, particularly backup operations performed on live file systems where the file system can be modified even as the backup operation is being performed, is that the resulting backup may not be name space consistent with the live file system. For example, the name of a file or directory in the live file system may change during a backup operation. This can result in a name space inconsistent backup at least because the file may be absent in the backup even though it resides in the live file system with a different name.

Usually, this problem is addressed by requiring that a snapshot be taken on the source file system. When a snapshot is used to perform a backup operation, there is an increase in the COW (copy on write) overhead. Further, snapshots require additional storage space and cooperation from storage administrators. Plus, the snapshots themselves require management. Systems and methods are needed that allow an eventually name space consistent backup to be performed without requiring a snapshot to be taken.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
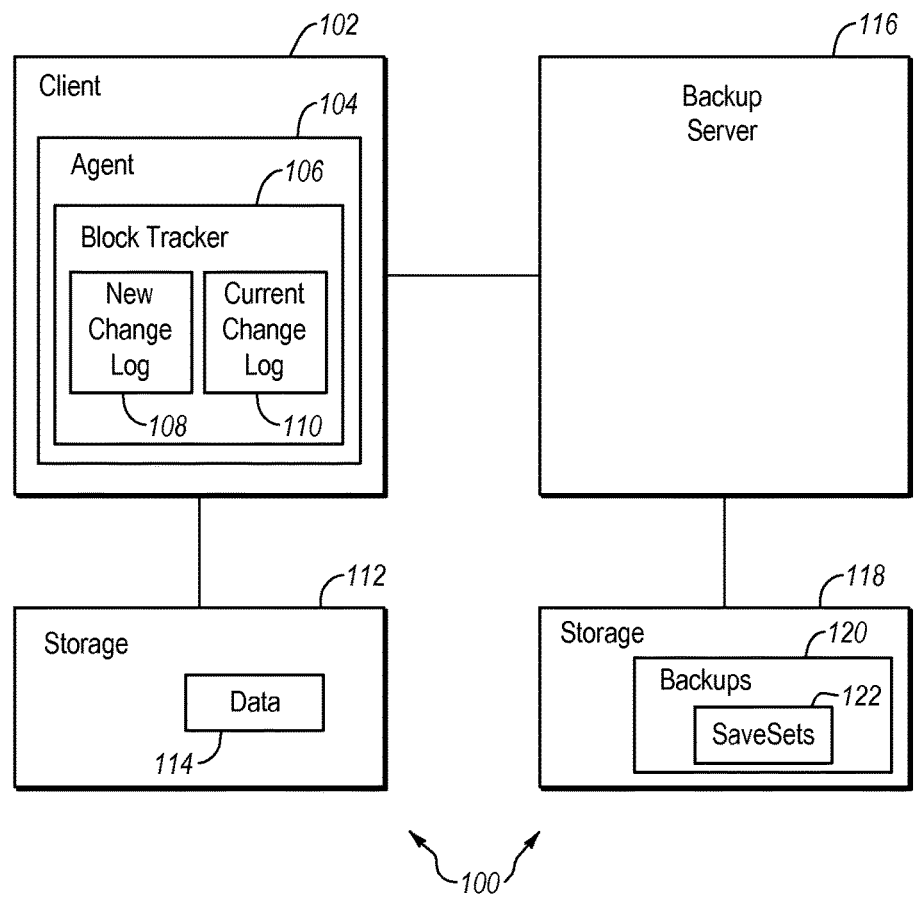
FIG. 1 illustrates an example of a backup system configured to generate backups of data without the benefit of a snapshot.

Embodiments of the invention relate to systems and methods for protecting data and more particularly to systems and methods for backing up data. Backed up data may be referred to as backups, backup save sets, backup save sets, or the like. Embodiments of the invention further relate to systems and methods for performing backup operations including incremental backup operations of live file systems. Eventually name space consistent backups can be achieved without performing a snapshot of the file system prior to performing the backup operation or at the beginning of the backup operation.

When a backup operation is performed on data stored in a file system or on a volume, the backup operation can perform a full backup, an incremental backup, or the like. An incremental backup operation is usually performed after a full backup operation has been performed or after a prior incremental backup. A full backup is usually performed the first time that the data is backed up. Full backups can also be performed at later times. Incremental backups can be associated with other incremental backups and/or a full backup. An incremental (or full) backup can be performed with respect to a storage device (or devices), a volume, a virtual disk or volume, a data share, file system, or the like or combination thereof. The data or save set associated with a particular backup may include or reside on multiple storage devices.

An incremental backup operation can be performed by tracking changes that occur to blocks (or files or chunks or other unit) in the data being protected or subject to the backup operation. Changes to the blocks are tracked by a change block tracker. When an incremental backup operation is performed, the blocks that need to be included in the incremental backup (e.g., those that have changed since the last backup) can be identified from logs maintained by the change block tracker. The change block tracker effectively identifies the blocks that have changed since the most recent backup operation. The change block tracker also allows changes (create, write, delete, etc.) in the file system to be identified. These changes can be identified without having to trawl the entire file system.

In one example, the change block tracker allows source level de-duplication to be formed because only changed blocks (which may be identified in a change log) are included in the incremental backup. The backup is effectively de-duplicated at least because only changed blocks are included in the incremental backup. Further de-duplication may also be performed, however, if one of the changed blocks is identical to a block already stored in the backups.

The change log includes a list of events in one example and can be used by a backup application to quickly identify all changes to the file system (or other data set). The backup application uses the information in the change log to complete an incremental backup of the file system. The change block tracker intercepts or identifies all operations that modify files in a file system (or the data set being backed up) and stores a record of the modifications for subsequent use by a backup application. When a backup is performed on a live file system, the backup application quickly identifies changed files using the change log. Embodiments of the invention ensure that the backup is eventually name space consistent. The change log is configured such that files that get renamed or are otherwise unavailable (e.g., cannot be read by the backup application) during the backup application are appropriately named or handled in the backup.

A backup operation is performed using the change log to achieve eventual name space consistency. This is achieved, in part, by including an inode number associated with the change or event. The inode number is also included in the change log. Thus, the change log, in addition to identifying the change or event that occurred to the block or blocks and/or the block or blocks that have changed, may also provide at least the inode number of the blocks or of the file that changed. With the inode number, the backup application can, in consultation with the change log, identify a path name and/or event history. In one example, when a name of a file changes such that the file to be backed up cannot be read by the backup application (because the backup application is looking at a different file name for example), the inode of that file (which does not change even if the file name changes) can be used to access the file or other appropriate log or record to identify the current name or path of the file. This information can be used to make a corresponding change in the backup for that file (or blocks) such that the backup is name space consistent. In this manner, the backup eventually becomes name space consistent.

FIG. 1 illustrates an example of a system 100 in which a backup system or application is configured to generate backups of data in a live file system. This is an example of generating a backup save set of a source data set. The system 100 includes a client 102 that is associated with a storage device 112. The client 102 and the storage device 112 may be integrated as a single device or connectable over a network. The client 102 may be a file server (or other type of server such as email server, database, or the like) and may be representative of a file system. The client 102, or the file system represented thereby, includes or manages files, represented as data 114. The data 114 is stored on the storage device 112 is an example of a data set. The storage device 112 may be direct attached storage, network based storage, or other storage device.

A backup system or application that operates in the computing system 100 may include or use a backup server 116 and/or an agent 104 to perform a backup operation. The backup server 116 may cooperate with an agent 104 to perform a backup operation for the data 114 of the client 102. The agent 104 may operate on the client 102 or on another device and may operate in a kernel of an operating system.

The backup server 116 may be associated with a storage device 118 (which may include multiple storage disks or other storage media). The storage device 118 may also be a datacenter or other cloud based storage. Backups 120 or backup save sets of the data 114 and/or of other data in the computing system 100 or on other clients may be included in the backups 120. In one example, the backups of the data 114 include the save sets 122. The save sets 122 may include one or more full backups, one or more incremental backups, and other data or metadata necessary to backup the data 114.

The agent 104 is associated with a block tracker 106. The block tracker 106 may be configured to intercept or identify all operations on the client 102 that modify files in the data 114. This information can be tracked in various ways. In one example, the block tracker 106 is configured to identify blocks that are changed during an operation or event. The block tracker 106 may identify files corresponding to the changed blocks. In one example, the block tracker 106 may also identify the operation or event that was performed. Example operations or events include, but are not limited to, creating a file, modifying a file, deleting a file, renaming a file or a directory, moving a file or data, or the like. Similar actions may be performed with respect to directories or other structures supported by the file system.

The block tracker 106 intercepts these operations and stores a record of these operations in a change log. An event, in one example, corresponds to the operation that was intercepted and recorded. FIG. 1 illustrates that the block tracker 106 may maintain multiple change logs. In one example, the block tracker 106 maintains at least a new change log 108 and a current change log 110. When the file system of the client 102 is operating, operations intercepted by the block tracker 106 are recorded in the current change log 110. When a backup operation is initiated, the current change log 110 is effectively closed and changes occurring subsequently to the initiation of the backup operation are logged in the new change log 108. The current change log 110 is then used to identify the blocks or files to be backed up (e.g., in an incremental backup). The current change log 110 may also be used to ensure that the backup save set is or becomes name space consistent as discussed in more detail below. When a subsequent backup operation is started, the new change log 108 becomes the current change log and another new change log (or the old current change log after the backup is completed) is used to record operations or event that affect the data 114.

Figure 2:
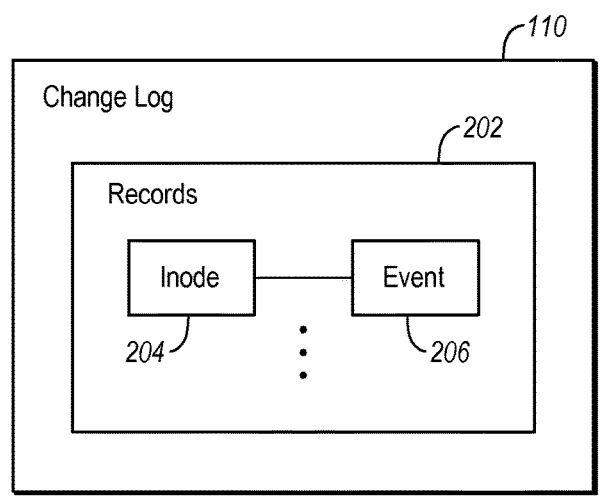
FIG. 2 illustrates an example of a change log used in performing a backup operation of a live file system.

FIG. 2 illustrates an example of a change log 110 that may be used in performing a backup operation of a file system or in performing a backup operation of a live file system. The change log 110 is an example of the change log being used for an incremental backup operation. The change log 110 includes records 202. Each record includes information that identifies an event or transaction in the file system relative to the data 114. By way of example, each record may include an inode 204 or inode number and an operation or transaction or event 206.

In one example, a file system is composed of files and directories. At the system level, all of the data exists as data blocks on a storage device. A file typically includes multiple blocks and an inode structure is used to identify the blocks that belong to a particular file. In some file systems (e.g., ext3/4 file systems), each file has an inode that is identified by an inode number. A file system has a set number of inodes, which indicates the maximum number of files the file system can hold. The inode number (or other information from the inode) that is stored in the change log 110 can be used to ensure that the backup is or eventually becomes name space consistent.

For example, there may be circumstances where the backup application cannot locate the file (or blocks) to be backed up because the name or path identified in the change log is no longer present in the file system. Including the inode number in the change log allows the appropriate file or blocks to be identified even if the name or other attribute of the file or blocks has changed. The event 206 ensures that once the proper file is identified in the live file system by the backup application using the inode number, the event identified in the event 206 can be applied to the backup. For example, if the name of a file is changed to a new name, the inode 204 and event 206 can be used to ensure that the corresponding file or blocks in the backup has the new name associated with the inode 204.

A backup operation may proceed as follows. At the time of backup, the backup application requests the block tracker 106 to store a list of all file system changes (mutations or events) that have occurred since the last backup to the current backup. These changes are stored, in one example, in the current change log 110, which may be a persistent file. As previously stated, new changes to the file system are recorded in the new change log 108. The new change log 108 can be used for the next backup operation.

The current change log 110 includes records 202. The records 202 are an example of a list of only those files (or blocks) that are important from the perspective of the ongoing backup in one example. The list of records in the change log 110 identifies all of the files and directories that have been created, modified, renamed, deleted, moved, or the like during the period associated with the present backup operation. The current summary change log 110 may contain one record for each such file. The record, as previously stated, may include an inode number 204 and the event (create, modify, rename, delete, etc.) that is applicable to that file. The record may also include sufficient information such that the change or transaction can be made solely from the information included in the record after the file is identified from the inode number.

As previously suggested, even though a file may be modified, embodiments of the invention contemplate backing up only the blocks of the file that have changed. Of course, the backup application could be configured to backup all blocks of the file if desired even if only some of the blocks of the file have changed.

The backup application reads the records from the current change log 110. For each record read by the backup application, the backup application has to either process a file delete, create, modify or a rename operation (or other operation) in the backup save set.

For example, if the operation recorded in the change log was a delete operation, the backup application removes the file from the backup save set. If the file operation was a rename operation, the backup application performs the rename operation on the file present in the backup save set after determining the current name using the inode number. If the file operation was a create or modify operation, the backup application may read the file from the source file system and create/update the file in the backup save set. Each of the operations performed on the backup save set may involve using the inode number in the change log to identify the file in the file system.

It is possible that before the backup application can read the file, the file may be deleted or renamed on the live file system due to racing file system activity. This prevents the backup application from reading the file. Stated different, the file cannot be found in one example because of the deletion or name change. If the file that was renamed was a directory, the backup application may be unable to read any file contained within the directory sub-tree references in the change log. Stated differently, the change log may reference a file name that no longer exists when the backup application is ready to back up the corresponding blocks or files.

Embodiments of the invention ensure that this racing activity does not adversely impact the backup or the consistency of the backup name space. To ensure that this type of racing activity does not affect the consistency of the backup name space, the inode number of each file that the backup application could not open or find is passed back to the agent 104 or block tracker 106 or other module of the backup application.

The agent 104 (or more generally the backup application) consults at least the summary change log 110 to identify the inode number of the file that cannot be accessed or read. The file identified by the inode number may be opened or accessed or read to determine the information that is incorrect or missing. In one example, a reference (e.g., the current file path and/or name) to the newly opened file is passed back to the backup application. The reference returned to the backup application is used to complete the backup operation. For example, the current file path/and or name is applied to the corresponding file or blocks in the backup save set created by the backup application.

If the agent 104 determines that the file associated with the inode number as passed by the backup application was deleted from the file system, the agent 104 returns a NULL reference to the backup application and the backup application in-turn deletes any reference to the file from the backup save set. In one example, the data may be removed from the backup save set or backup data set unless the data corresponds to another backup save set.

After all the records as listed in the current change log 110 have been processed, the backup is complete.

Figure 3:
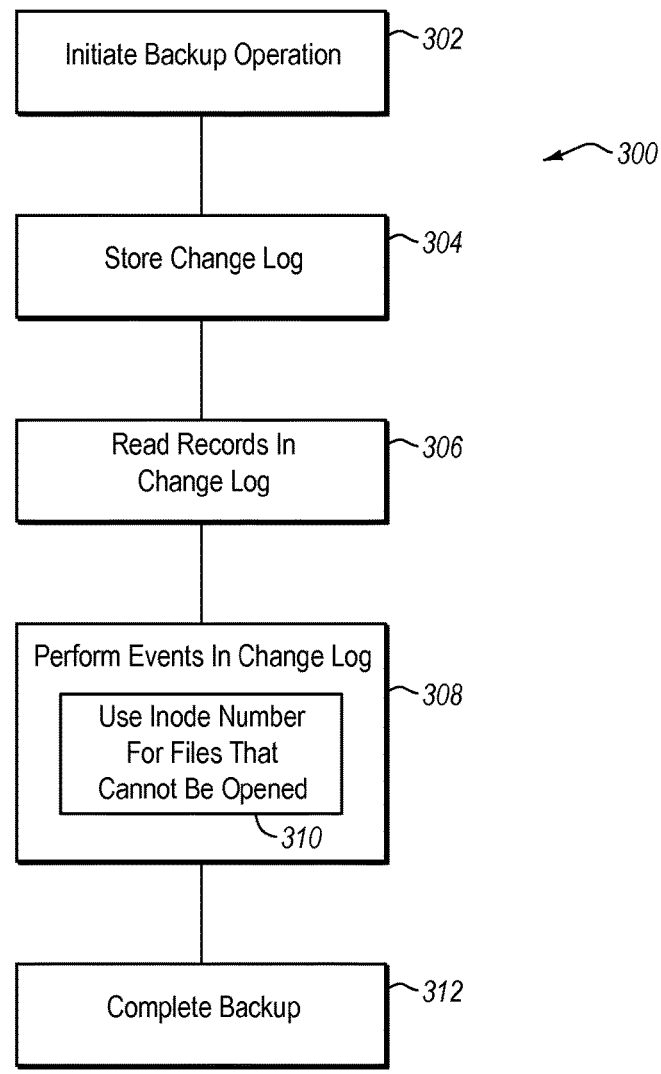
FIG. 3 illustrates an example of a method for performing a backup operation on a live file system to achieve an eventual name space consistent backup without the need of a snapshot.

FIG. 3 illustrates an example of a method for performing a backup operation on a live file system to achieve a name space consistent backup. In one example, the name space consistent backup can be achieved without having to take a snapshot of the file system. At box 302, a backup operation is initiated. After the backup operation is initiated, the change log is stored in a file in box 304. The file may already exist and, when the backup operation is initiated, no further information is added to the change log. Stated differently, the change log is a file and the file may be closed when the backup operation is initiated. This file or summary change log reflects changes or modifications to the file system in a time period between the most recent backup operation and the presently initiated backup operation. The summary change log includes records and each record identifies at least an event and an inode number. Specific blocks that have changed may also be identified in the summary change log.

As the backup operation is performed, the records in the summary change log are read by the backup application in box 304. The events in the change log can be applied to the backup save sets if necessary. The changes can be made as the backup save sets are being generated or after the backup save sets have been generated. In one example, it may not be necessary to copy the changed blocks in the file system to the backup save sets. Rather, the incremental backup can be generated by simply applying the change to data already existing in the save sets or in the backups. For example, a deletion can include removing the corresponding file or blocks from the backup save sets. In one example, however, changes are applied to the present backup save set.

The backup operation is performed in block 306 by backing up the files or blocks identified in the summary change log. When the file or blocks to be backed up cannot be found, by way of example due to a name change, the inode number is used to identify the file or blocks and the corresponding blocks are backed up in accordance with the event and with the appropriate path and file name.

In box 308, the events identified in the summary change log may be performed. This can include performing write operations, modify operations, create operations, and the like to the backup save sets. The specific operation performed on the backup save set depends on the event in the summary change log. In some examples, data not present in the backup save sets will need to be created. For example, if the event in the change log is the creation of a new file, then the new file does not yet exist in the backup sets. Performing the operation may require the backup application to read the new file from the source file system in order to copy the new file to the backup save sets. Generally, the inode allows the appropriate file to be located so that the name and/or path can be made consistent between the backup save set and the live file system. In other examples, once the file is located, it may be necessary to copy some of the blocks of the file to the backup save set (e.g., the blocks that have changed).

In some instances, the backup application may not be able to access the file in the source file system. Because the live file system is being backed up, changes may be occurring in the live file system. For example, a file or directory may be renamed while the backup operation is being performed. As a result, any files in the file system that relate to the old file or directory name in the events maintained in the summary change log may not be able to be performed.

In this case, the inode number associated with the event is used to access the appropriate file in the file system in box 310. Using the inode number, the file system can be accessed to determine the new name of the file and/or directory or, more generally, the path. Once this information is ascertained, appropriate changes can be made to the backup save sets if necessary. This ensures that the backup or the backup save sets are name space consistent with the live file system at the time the backup operation was performed.

The events in the current change log may be applied in order. In another example, the events for which the inode is not needed may be performed if necessary and then the events for files are identified using the inode are performed if necessary. Once the events in the current change log are completed, the backup is completed in box 312.

In one example, the backup operation is performed by backing up the blocks or files that are identified in the summary change log. In the event that the backup application is unable to read the file when performing the backup application, then the inode number may be used to obtain the correct path and file name such that the file or blocks can be backed up with the appropriate path and file name. If the file was deleted, then any reference to the file or blocks is removed from the save set if necessary. The blocks may also be removed from the backup save set if present.

In one example, an incremental backup operation is performed by copying the changed blocks or files in the live file system to a backup save set. The blocks or files to be backed up are identified in the current or summary change log. Each record thus identifies the files or blocks to be backed up. This is done, in one example, by reading or accessing the changed blocks or file in the live file system as identified in the summary change log and writing a copy of the changed blocks or of the changed file to the backup save set. Thus, a backup save set may be generated. Embodiments of the invention further ensure that the backup save set is or eventually becomes name space consistent. As described herein, it may be necessary to make a change to the backup save set in certain circumstances. This can be done after the save set is generated by applying the events in the change log as appropriate to the backup save set. For example, files or blocks identified in the change log that could not be read are processed after the other blocks or files are processed. Alternatively, these steps or acts can be performed substantially at the same time as the summary change log is processed.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. In one example, the agent and block tracker and change log are examples of components or modules. The backup application may include other backup modules that reside on the backup server and/or the clients in the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation in a file system, the method comprising:
    initiating, by a backup server that includes a processor, the backup operation of the file system stored on one or more storage devices in order to generate a backup save set with a backup application;
    storing a change log associated with the backup operation, wherein the change log includes records of operations that were performed in the file system and identifies blocks of the data or files that have changed since a previous backup operation, wherein the change log is configured to store a name and/or path associated with the blocks of the data or files that have changed and an inode number;
    backing up, by the backup server, the blocks of data or files identified in the change log on a backup storage device;
    accessing files based on inode numbers associated with the one or more storage devices when data blocks or files identified in the change log cannot be read using the associated name and/or path such that the changed blocks or files can be included in the backup save set; and
    changing the name and/or path of the data blocks or files that could not be initially read by the backup application in the backup save set such that the backup save set is namespace consistent with the data blocks or files.

2. The method of claim 1, further comprising performing the operations identified in the change log on the backup save set.

3. The method of claim 1, further comprising accessing the files based on inode numbers includes opening the files and passing a reference to the newly opened files back to the backup application.

4. The method of claim 3, further comprising performing the events corresponding to the newly opened files on the backup save set.

5. The method of claim 4, further comprising deleting any reference to a file when a reference to the file returned to the backup application is NULL.

6. The method of claim 1, wherein the modifications to the files are stored in the change log.

7. The method of claim 1, further comprising initiating the backup operation without taking a snapshot of the file system.

8. A method for performing a backup operation in a live file system, the method comprising:
    initiating, by a backup server that includes a processor, the backup operation of the live file system with a backup application without taking a snapshot of the file system, the live file system stored on one or more storage devices;
    closing a change log that stores events that occurred in the file system since a previous backup operation to the present backup operation, wherein the change log identifies blocks in file system that have changed since the previous backup, wherein the change log is configured to store a name and/or path associated with the blocks of the data or files that have changed and another identifier;
    generating, by the backup server, a backup save set of the live file system by backing up the blocks identified in the change log; and
    for the events in the change log corresponding to files that cannot be read by the backup application, determining a current name and/or path of the files in the live file system using the another identifier;
    ensuring that the changes to the files that cannot be initially read by the backup application are included in the backup save set of the file system; and
    changing the name and/or path of the files that could not be initially read by the backup application in the backup save set such that the save set is namespace consistent with the blocks of data or files.

9. The method of claim 8, wherein ensuring that the changes to the files that cannot be read further comprises performing the operations identified in the change log on the backup save set.

10. The method of claim 8, wherein determining a current name and/or path of the files in the live file system comprises accessing the files based on inode numbers that are stored in the change log with the events.

11. The method of claim 10, further comprising opening the files and passing a reference to the newly opened files back to the backup application.

12. The method of claim 11, further comprising performing the events corresponding to the newly opened files on the backup save set.

13. The method of claim 8, further comprising deleting any reference to a file when a reference to the file returned to the backup application is NULL.

14. The method of claim 8, wherein the modifications to the files are stored in the change log.

15. The method of claim 1, further comprising ensuring that the backup save set is name space consistent with the live file system.

16. A method for generating a name space consistent backup save set, the method comprising:
    initiating, by a backup server that includes a processor, a backup operation of a live file system with a backup application to generate a backup save set of the live file system;
    backing up, by the backup server, data blocks in the live file system that have changed in a time period since a previous backup operation and the backup operation, wherein the changes are identified in a change log that associates inode numbers with files that have changed in the time period, wherein the change log is configured to store a name and/or path associated with the blocks of the data or files that have changed and the inode numbers; and
    accessing files identified in the change log that cannot be initially read by the backup application based on the name and/or path in the change log using the inode numbers stored in the change log, wherein the inode numbers enable the backup application to determine a current path and name of the files that cannot be initially read such that the backup application can eventually make the backup save set name space consistent with the live file system by accessing the files using the inode numbers; and changing the name and/or path of the files that could not be initially read by the backup application in the backup save set such that the backup save set is namespace consistent with the data blocks or files.

17. The method of claim 16, further comprising making the changes to the blocks in the backup save set corresponding to the files accessed using the inode numbers.

18. The method of claim 16, further comprising initiating the backup operation without performing a snapshot of the live file system.

* * * * *